D. E. SOMES & F. C. SOMES.
Improvement in Apparatus for Cooling and Preserving Milk and other Liquids.

No. 114,985.

4 Sheets--Sheet 1.

Patented May 16, 1871.

Attest
Inventors

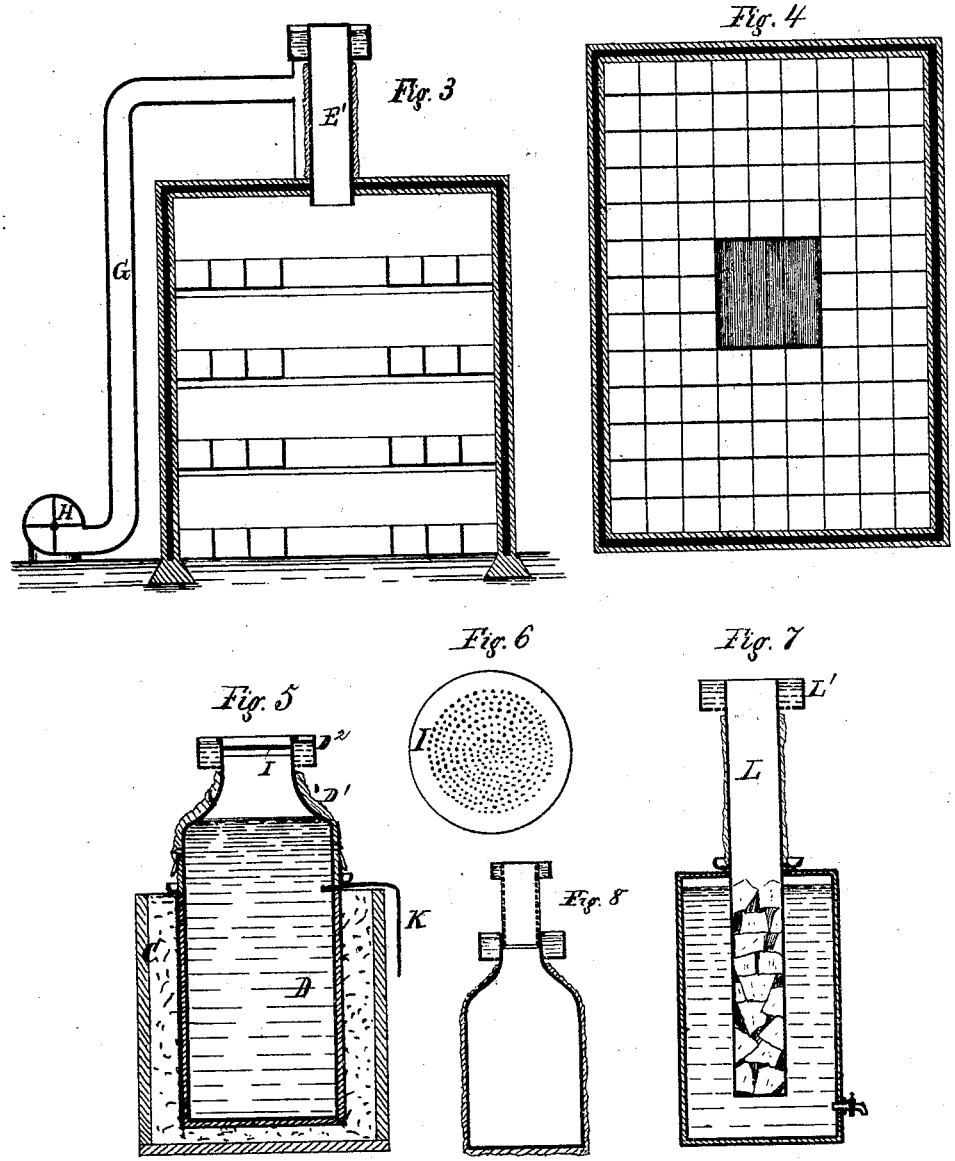

D. E. SOMES & F. C. SOMES.
Improvement in Apparatus for Cooling and Preserving Milk and other Liquids.
No. 114,985.
4 Sheets--Sheet 3.
Patented May 16, 1871.
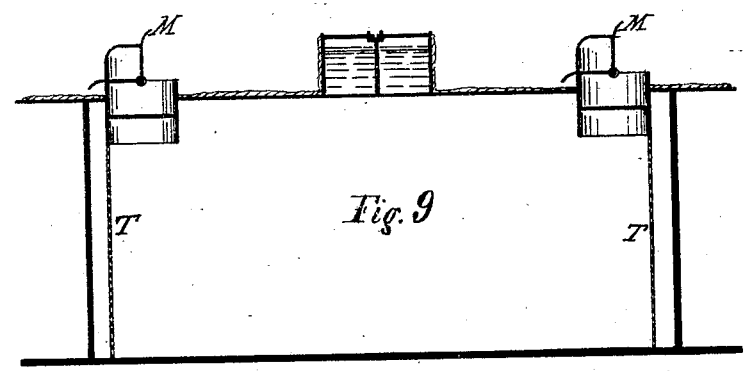
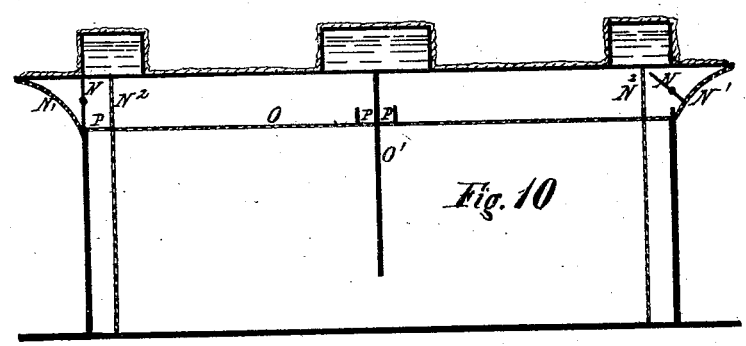
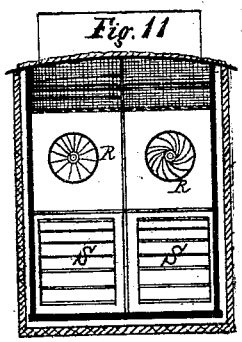

4 Sheets--Sheet 4.
D. E. SOMES & F. C. SOMES.
Improvement in Apparatus for Cooling and Preserving Milk and other Liquids.
No. 114,985. Patented May 16, 1871.
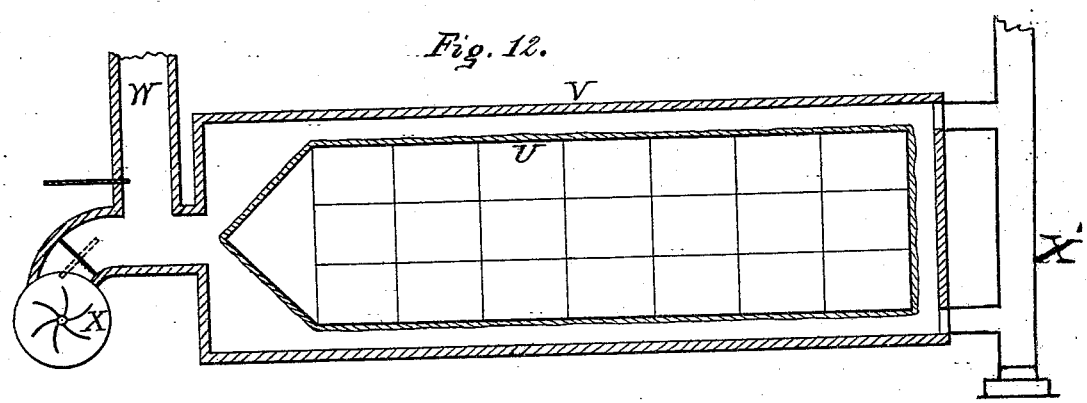
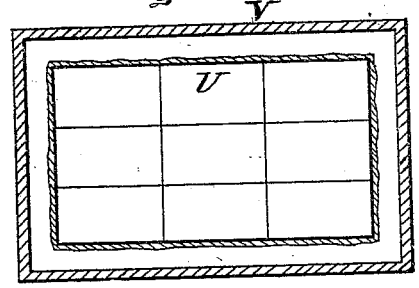
Attest
Inventors.

UNITED STATES PATENT OFFICE.

DANIEL E. SOMES AND FRANK C. SOMES, OF WASHINGTON, D. C.

IMPROVEMENT IN APPARATUS FOR COOLING AND PRESERVING MILK AND OTHER LIQUIDS.

Specification forming part of Letters Patent No. 114,985, dated May 16, 1871.

*To all whom it may concern:*

Be it known that we, DANIEL E. SOMES and FRANK C. SOMES, of Washington, in the county of Washington, and in the District of Columbia, have invented a new and useful Improvement in Means for Cooling and Preserving Liquids; and we do hereby declare that the following is a full, clear, and exact description thereof, reference being had to the annexed drawing, making a part of this specification, in which—

Figure 1:
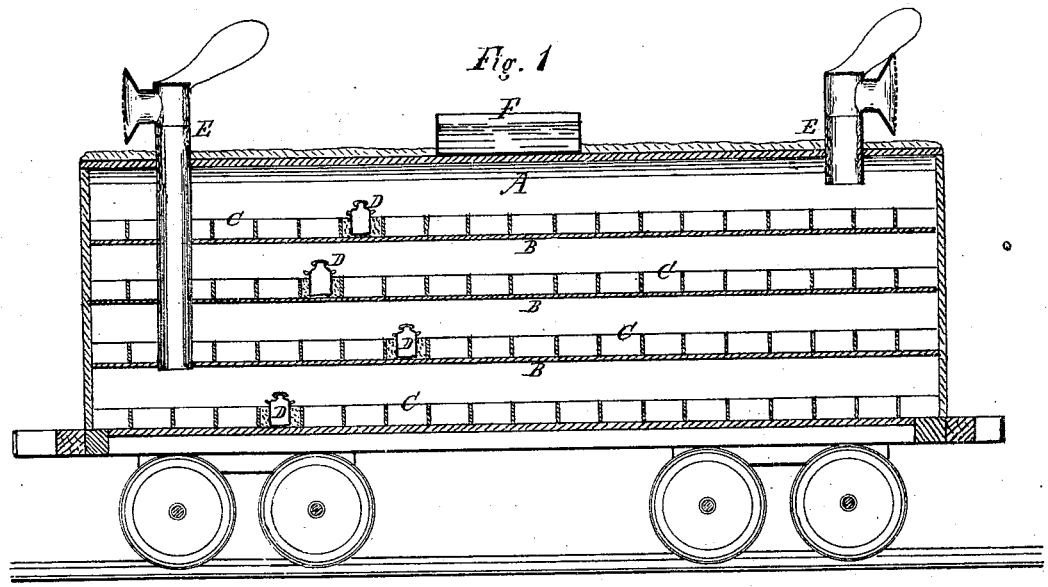
Figure 2:
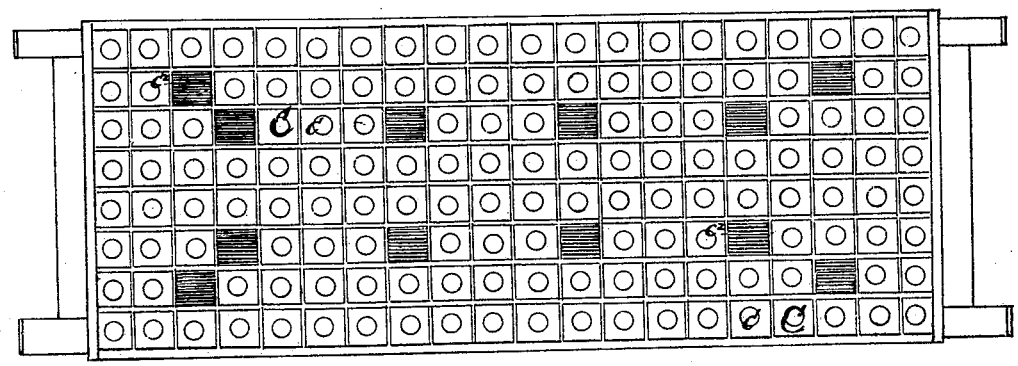

Figure 1 is a vertical longitudinal section of a railroad-car constructed after our improved plan, to serve for the transportation of milk, beer, and the like. Fig. 2 is a horizontal section of the same. Fig. 3 represents a vertical transverse section of a building provided with means to preserve an even temperature in its interior, as well as to cause a gentle ventilation through it, into which cars containing cans of milk may be drawn to be discharged, or it may represent a room in a building for the storage of cans of milk, &c. Fig. 4 is a horizontal section of such a room, containing a series of boxes for the reception of cans of milk. Fig. 5 is a vertical section of a milk-can set in a box, and provided with means for cooling its contents and for excluding dust and other impurities. Fig. 6 is a plan view of the additional perforated cover of the milk-cans. Fig. 7 illustrates a milk-can or water-cooler covered with wet cloth around the projecting evaporating-tube, which extends down into it to near the bottom, and which may serve as an ice-receptacle when the contents of the can are to be reduced to a low temperature. Fig. 8 is a section of a milk-can covered entirely with cloth wet from a tank around its neck, and which is closed with a vertical perforated tube, which is also wrapped in a thin wet cloth to exclude dust, while admitting of the required ventilation. Fig. 9 is a longitudinal section of a railroad-car with ventilators, the hoods of which are automatically operated by the action of the wind. Fig. 10 represents a car with a perforated horizontal partition near the roof, above which partition the wind enters through a suitable damper at either end, being compelled to take a tortuous course by a solid vertical partition reaching from the top to near the floor. Fig. 11 is a transverse section of the car shown in Fig. 10. Fig. 12 is a longitudinal vertical section of a receptacle for milk in cans or pans, covered with wet cloth, and surrounded by an outer shell, with an air-space between the two through which air is forced or drawn. Fig. 13 is a transverse section thereof.

The object of our invention is to provide suitable means for the transportation and storage of large quantities of fresh milk, by which the following very desirable ends shall be obtained: First, the gradual cooling of the milk, whether transported or stored in cans or pans; and, secondly, its continued gentle ventilation while the cooling process is under way, so that all the deleterious gases contained in it may be carried off, suitable means being provided for the effective exclusion of dust, &c.

The improvements consist in constructing the cars for transporting and the rooms for storing the milk with a series of boxes in which the body of the can is partly inclosed, surrounded by some non-conducting material, and effecting the cooling and ventilation of the milk by suitable ventilators, and by means of evaporation upon the body of the car and the protruding portion of the milk-cans; also, in constructing the cans of glass, fitted with a tight stopper, and provided with a rod for conducting off the electricity which is contained in them after the milk has been properly cooled and the cans have been closed.

To enable those skilled in the art to make and use our invention, we will proceed to describe its construction and operation.

In the annexed drawing, A refers to the body of a railroad-car constructed with a number of sliding doors, so that convenient access to its interior may be had from either side. The car is divided by horizontal partitions B into several compartments or stories, one above the other, and upon each such partition is formed a series of cells or boxes, C, which are usually left entirely open on top. The cells are about half the height of the milk-can, and are constructed with double walls, the intervening space being packed with sawdust or any good non-conducting material. The cans D are set into these cells, and the upper protruding portion of each can is covered with some fibrous material, $D^1$, which is constantly wet with water dripping from a basin, $D^2$, formed around the top of the neck of the can. The cloth should usually extend up around the basin.

Suitable openings $C^2$ must be formed in the horizontal partitions to permit the free circulation of the air through all parts of the car.

Near each end the car carries a cooling and ventilating tube, E, opening with its lower end into either compartment of the car. Its top end is surmounted by a hood, through the flaring mouth of which the air is received, and, after passing through the compartments of the car, is discharged through the tube at the other end. The hoods revolve on the tubes, and are provided with the ordinary vanes, as shown, so that the mouth of one will be caused to face the wind, while the other has its back turned toward it, when the car stands still. When the car is in motion the mouth of the hood of the tube at the front end may point forward, and the one at the rear end rearward, in which position they may be locked in any suitable manner.

The top, and, if found desirable, the walls also of the car, are clothed in a covering of some fibrous material, to be constantly wet with water contained in a suitable tank placed on the top of the car, as shown at F, Fig. 1.

The walls of the building or room shown in Figs. 3 and 4 are, in similar manner, covered with cloth, which should be constantly kept wet to abstract, by evaporation, heat from the interior.

One or more evaporating-tubes, E', constructed in the usual manner, as shown, are placed upon the top of the building or apartment, against which a current of air may be blown, through a duct or tube, G, by means of a blower, H, in the manner clearly indicated in Fig. 3. If it is a depot-building, suitable tracks must be laid in it, so that the milk-car or cars can be run in and kept cool until the dealers call for the milk. If it is a store-room, it should be constructed with cells or boxes similar to the car, in the manner shown in Fig. 4; or it may contain a tank of cold water into which to place the cans.

The mouth of the milk-cans, while the milk is being ventilated, should be uncovered, and be closed by a supplementary cover, I. The latter is a perforated disk, neatly fitting the neck of the can, and resting upon a shelf or offset formed therein, and it, in turn, is covered with a wet cloth to catch the dust, cinders, &c. Instead of a perforated disk, a circular sheet of fine-mesh wire-cloth may be used, if preferred.

The interior of the ventilating-tubes E may also be covered with wet cloth, to which any dust or cinders not excluded by the screen will adhere and be prevented from passing into the car; and the flaring mouths of the hoods should be closed with fine-mesh wire-cloth.

The body of the milk-cans is sometimes made of glass and fitted with a tight-fitting stopper. When thus made a conducting-wire, K, is passed into them, connected at the other end with the earth or water, for the purpose of discharging the electricity contained in the cans.

The milk-can shown in Fig. 7 is surmounted by a central evaporating-tube, L, which extends down into and to near the bottom of the can, its lower end being closed, while its upper end is open to admit of a free circulation of the air through it.

The tube carries a basin or reservoir, L', for containing the liquid with which to wet its cloth covering and that of the can when thus jacketed. The milk is poured into the can through a suitable gate in its top, and drawn off through a cock in the lower end of the can.

This can may with advantage be used as a water-cooler, in which case the tube L is filled with ice.

Instead of the perforated disk described, a vertical perforated tube, closed on top, and resting with its lower open end upon a collar in the neck of the can, may be used, it being covered with cloth wet with water from a basin around its upper end, as clearly shown in Fig. 8.

This manner of constructing railroad-cars with cells for the reception of perishable substances to be transported may with advantage be employed in ships and other vessels for carrying such articles as hereinbefore mentioned, as well as for the transportation of strawberries, peaches, pineapples, and other tropical fruits, and various kinds of vegetables.

It is designed to surround each of the evaporating-tubes used with a suitable screen to protect them from the rays of the sun and from the rain, the screens being so constructed as to allow the wind to blow through them against the tubes.

In Fig. 9 the hoods are made to cover about one-half of the ventilating-tubes at each end of the car, and are pivoted upon a horizontal rod passing through the tubes transversely to the car. Upon each end the hoods are provided with an overhanging lip or flange, M, under which the wind catches and throws the hood over to make it face the wind. In this case the wire-cloth screens are inserted in the tubes, as shown.

The car shown in Fig. 10 differs from those heretofore described in dispensing with the ventilating-tubes and placing suitable ventilators at each end directly under the roof. These ventilators N turn on suitable pivots and play behind screens $N^1$, which are intended to exclude cinders and dust. In the interior of the car a horizontal perforated partition, O, is stretched across it, just below the ventilator, through which partition the air passes into the interior below it, being prevented from passing through in a direct line above the horizontal partition by a solid vertical partition, O', which extends from the roof to near the floor, as indicated.

Any dust and cinders which may enter through the screens $N^1$, striking against the interior screens N², or against the vertical partition O', fall into the open gutters or boxes P, from which they can be readily removed.

A coarse open cloth, suitably moistened, is or may be placed upon the horizontal perforated partition, which, by the evaporation of the moisture upon it, serves as a means for cooling the air as well as a means of catching the finer particles of dust.

The means for ventilating just described are also especially applicable to passenger-cars, the only change necessary being that that portion of the partition O' projecting below the horizontal partition be removed.

In Fig. 11 the body of the car is made of metal, covered with wet cloth upon all sides, and surrounded with a wooden shell, Q, leaving an air-space between it and the body of the car for the wind to sweep through to evaporate the moisture contained in the cloth. The outer shell serves to protect the wet cloth against the rays of the sun and too rapid evaporation of its moisture. In the ends of the car additional ventilators R and S are shown, which may be of advantage in some cases; but which are dispensed with in passenger-cars.

The car shown in Fig. 9 has also in some cases a perforated vertical partition, T, near each end, and convenient ventilators are placed in the end walls, near the top, for the admission and exit of air.

The milk-receptacle U, illustrated in Figs. 12 and 13, consists of a rectangular box of any desired dimensions, and is made either of sheet metal, or wire-cloth, or an open frame-work, and is covered with wet cloth. Its interior has several stories or a series of shelves for the reception of cans or pans of milk. This receptacle is surrounded by or inclosed in an outer box, V, of somewhat larger dimensions, so that an air-space is formed around the receptacle, through which currents of air are caused to pass to produce cold in the receptacle by evaporating the moisture in the covering-cloth, and also to ventilate its interior. The air enters either through a vertical tube, W, or is forced in by a blower, X'—in which case the vertical tube W is closed by a damper—and passes out of the box V, through openings in its opposite end, into a heated flue, as shown at X, or to any desired place, dispensing with the flue, if necessary.

Suitable water-reservoirs are arranged in the shell or box V for wetting the cloth covering the milk-receptacle. These reservoirs, as well as those already referred to, are provided with a gutter or pipe having small holes for the equal distribution of the liquid upon the fibrous material. They are also each provided with a faucet, or its equivalent, for the regulation of the liquid as it is discharged into the gutter or pipe.

A small gutter with a tight bottom is provided beneath the wet covering to conduct away any surplus water that may accumulate.

When the evaporating process is to be employed in cooling buildings, cars, apartments, &c., the walls and roof are preferably made of good conducting thin metal, as copper, zinc, iron, or the like, and well braced or corrugated.

When packed spaces surrounding the chambers to be cooled are resorted to for the purpose of retaining cold and excluding heat, we employ as a good non-conductor asbestus, in connection with or in lieu of charcoal, sawdust, and other substances now in common use, or air-tight chambers.

Having thus fully described our invention, what we claim, and desire to secure by Letters Patent, is—

1. A railway-car or other vehicle constructed with cells in its interior, with surrounding air or packed spaces for the reception of milk-cans and other vessels, substantially as described.

2. Such car, in combination with means for cooling and admitting and discharging air, substantially as described.

3. A milk-can wholly or partially covered with some fibrous or porous substance, with means for keeping it wet, substantially as and for the purpose set forth.

4. A milk-can with a perforated disk, constructed substantially as and for the purpose set forth.

5. A milk-can, substantially as described, having an electric rod attached thereto, substantially as and for the purpose set forth.

6. An apartment in a building, or ship, or other vessel, constructed as described, with means for keeping it cool, substantially as and for the purpose set forth.

7. A closet or apartment for milk, with the means described and shown in Figs. 12 and 13 for cooling and ventilating, and for the exclusion of insects and dust, substantially as set forth.

D. E. SOMES.
F. C. SOMES.

Witnesses:
B. R. SOMES,
A. MOORE.